(12) United States Patent
Ameling

(10) Patent No.: US 11,086,617 B2
(45) Date of Patent: Aug. 10, 2021

(54) AUTOMATED ARCHITECTURE MODELING FOR INTEGRATED ENTERPRISE SCENARIOS

(71) Applicant: SAP SE, Walldorf (DE)

(72) Inventor: Michael Ameling, Dresden (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/583,619

(22) Filed: Sep. 26, 2019

(65) Prior Publication Data

US 2021/0096850 A1    Apr. 1, 2021

(51) Int. Cl.
   *G06F 9/44*    (2018.01)
   *G06F 8/70*    (2018.01)

(52) U.S. Cl.
   CPC .................... *G06F 8/70* (2013.01)

(58) Field of Classification Search
   CPC ........................................................ G06F 8/70
   USPC ................................ 717/101–113, 120–123
   See application file for complete search history.

(56) References Cited

U.S. PATENT DOCUMENTS

| | | | |
|---|---|---|---|
| 7,668,112 B2 * | 2/2010 | Helfman | H04L 41/145 370/252 |
| 8,046,326 B2 | 10/2011 | Ameling et al. | |
| 8,433,716 B2 | 4/2013 | Wolf et al. | |
| 8,749,499 B2 | 6/2014 | Ameling et al. | |
| 9,171,252 B2 | 10/2015 | Herzig et al. | |
| 9,286,584 B2 * | 3/2016 | Mayerle | G06Q 10/06 |
| 9,630,109 B2 | 4/2017 | Herzig et al. | |
| 9,710,430 B2 * | 7/2017 | Werner | G06F 16/282 |
| 9,923,893 B2 | 3/2018 | Ameling et al. | |
| 10,218,803 B2 | 2/2019 | Ameling | |
| 2010/0280863 A1 * | 11/2010 | Wilcock | G06Q 10/067 705/7.11 |
| 2012/0158603 A1 | 6/2012 | Ameling et al. | |
| 2013/0162519 A1 | 6/2013 | Ameling et al. | |
| 2014/0051506 A1 | 2/2014 | Ameling et al. | |

(Continued)

OTHER PUBLICATIONS

Dragon1, "Enterprise Architecture Tool", 2016, retrieved from https://web.archive.org/web/20161012101001/https://www.dragon1.com/enterprise-architecture-tool, 6 pages (Year: 2016).*

(Continued)

*Primary Examiner* — Ted T. Vo
(74) *Attorney, Agent, or Firm* — Fish & Richardson P.C.

(57) ABSTRACT

Methods, systems, and computer-readable storage media for automatically generating a diagram representing a software system deployed within an enterprise landscape include actions of receiving, by an automated modeling tool of an enterprise architecture designer, information representing the software system as deployed in the enterprise landscape, the information being received from software tools in a format that is common across each of the software tools, the format enabling processing of the information for generation of a model of the software system, the software tools being executed to maintain the software system within the enterprise landscape, generating, by the automated modeling tool, the model of the software system as deployed in the enterprise landscape based on the information, the model being stored in a model repository, and displaying a diagram based on data stored in the model repository, the diagram graphically representing the software system as deployed in the enterprise landscape.

20 Claims, 4 Drawing Sheets

(56) References Cited

U.S. PATENT DOCUMENTS

2015/0160018 A1    6/2015    Ameling et al.
2018/0054327 A1    2/2018    Ameling
2019/0014153 A1*  1/2019    Lang .................... G06F 21/604

OTHER PUBLICATIONS

Dragon1, "How to create an Application Landscape Diagram", Jan. 2019, retrieved from https://web.archive.org/web/20190118071819/https://www.dragon1.com/tutorials/how-to-create-an-application-landscape-diagram, 11 pages (Year: 2019).*

Dragon1, "Visual Designer", 2016, retrieved from https://web.archive.org/web/20160806025430/https://www.dragon1.com/applications/visual-designer, 4 pages (Year: 2016).*

Dragon1, "Architecture Repository", 2016, retrieved from https://web.archive.org/web/20161012074414/https://www.dragon1.com/applications/architecture-repository, 4 pages (Year: 2016).*

U.S. Appl. No. 16/188,939, Schroeder et al., filed Nov. 13, 2018.
U.S. Appl. No. 16/206,230, Ameling et al., filed Nov. 30, 2018.
Unified Modeling Language, "Welcome to UML Web Site!" Sep. 2019, [retrieved on Sep. 18, 2019], retrieved from: URL <http://www.uml.org/>, 3 pages.

Fundamental Modeling Concepts, "Home of Fundamental Modeling Concepts" Sep. 2019, [Retrieved on Sep. 18, 2019], retrieved from: URL <http://www.fmc-modeling.org/home>, 1 page.

Microsoft, "Flowchart maker and Diagramming software—Microsoft Visio", Sep. 2019, [Retrieved on Sep. 18, 2019], retrieved from: URL <https://products.office.com/en-us/visio/flowchart-software?rtc=1>, 6 pages.

SAP, "SAP Enterprise Architecture Designer" Sep. 2019, [Retrieved on Sep. 18, 2019], retrieved from: URL <https://www.sap.com/products/enterprise-architecture-designer.html>, 9 pages.

Eclipse, "Fundamental Modeling Concepts" Sep. 2019, [Retrieved on Sep. 18, 2019], retrieved from: URL <https://www.eclipse.org/fmc/>, 2 pages.

* cited by examiner

AUTOMATED ARCHITECTURE MODELING FOR INTEGRATED ENTERPRISE SCENARIOS

BACKGROUND

Enterprises use software systems to conduct operations. Example software systems can include, without limitation, enterprise resource management (ERP) systems, customer relationship management (CRM) systems, human capital management (HCM) systems, and the like. Software systems are often implemented in very distributed computing environments. Such environments can include a cloud-computing environment and a combined on-premise and cloud-computing environments (e.g., hybrid landscape). As such, such software systems and the underlying infrastructure are increasingly more complex.

Applications executed in distributed computing environments rely on a highly distributed infrastructure and a high number of software artefacts (e.g., micro-services, modules, extensions). Developers, architects and system administrators require detailed and up-to-date modeling and documentation of software architecture and landscapes. Ideally a common structure or language, such as Unified Modeling Language (UML), is used to provide documentation on architecture and landscapes. However, significant effort is required in terms of time and computing resources to keep the documentation up-to-date and to share the documentation in distributed team environments. Furthermore, the modeling is mostly used in the planning and conceptional phase and is not continued after instantiations of a landscape. Therefore, in many cases documentation and reality do no match and have no direct linking.

SUMMARY

Implementations of the present disclosure are directed to an enterprise architecture design platform for modeling integrated enterprise scenarios. More particularly, implementations of the present disclosure are directed to an enterprise architecture design platform that includes an automated modeling tool, which leverages information directly from software tools that maintain a software system that has been provisioned into enterprise scenarios (e.g., deployed to a landscape of an enterprise) to automatically generate one or more models that may be visualized in diagrams based on a current state of the deployed software system.

In some implementations, actions for automatically generating a diagram representing a software system deployed within an enterprise landscape include receiving, by an automated modeling tool of an enterprise architecture designer, information representing the software system as deployed in the enterprise landscape, the information being received from one or more software tools in a format that is common across each of the one or more software tools, the format enabling processing of the information for generation of a model of the software system, the one or more software tools being executed to maintain the software system within the enterprise landscape, generating, by the automated modeling tool, the model of the software system as deployed in the enterprise landscape based on the information, the model being stored in a model repository, and displaying a diagram based on data stored in the model repository, the diagram graphically representing the software system as deployed in the enterprise landscape. Other implementations of this aspect include corresponding systems, apparatus, and computer programs, configured to perform the actions of the methods, encoded on computer storage devices.

These and other implementations can each optionally include one or more of the following features: the diagram including one or more uniform resource locators (URLs) that is selectable to navigate to one or more of a respective portion of the software system and a component of the enterprise landscape; actions further include transmitting, by the automated modeling tool, a query to the one or more software tools, the query including an identifier that uniquely identifies the software system, the information representing the software system as deployed in the enterprise landscape being received in response to the query; the one or more software tools include one or more of a reporting tool, an integration tool, and an informational tool; actions further include determining that the model of the software system as deployed in the enterprise landscape, and, in response, generating the model includes updating the model based on the information; actions further include receiving user input to the diagram and modifying the model based on the user input; and the diagram includes one of a system landscape diagram and a capability diagram.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
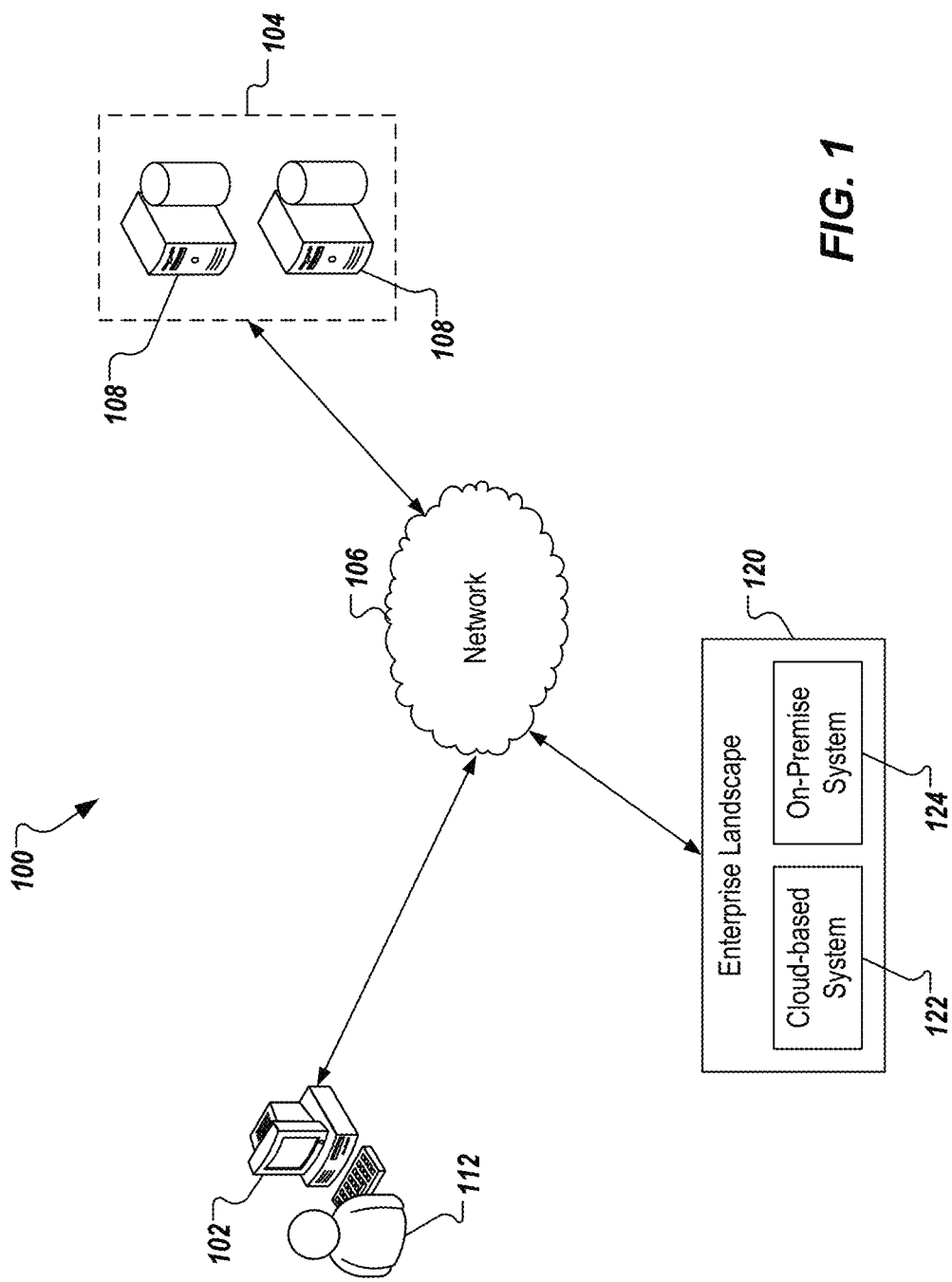
FIG. 1 depicts an example architecture that can be used to execute implementations of the present disclosure.

Implementations of the present disclosure are directed to an enterprise architecture design platform for modeling integrated enterprise scenarios. More particularly, implementations of the present disclosure are directed to an enterprise architecture design platform that includes an automated modeling tool, which leverages information from software tools that maintain a software system that has been provisioned into enterprise scenarios (e.g., deployed to a landscape of an enterprise) to automatically generate one or more models that may be visualized in diagrams based on a current state of the deployed software system. Implementations for automatically generating a diagram representing a software system deployed within an enterprise landscape can include actions of receiving, by an automated modeling tool of an enterprise architecture designer, information representing the software system as deployed in the enterprise landscape, the information being received from one or more software tools in a format that is common across each of the one or more software tools, the format enabling processing of the information for generation of a model of the software system, the one or more software tools being executed to maintain the software system within the enterprise landscape, generating, by the automated modeling tool, the model of the software system as deployed in the enterprise landscape based on the information, the model being stored in a model repository, and displaying a diagram based on data stored in the model repository, the diagram graphically representing the software system as deployed in the enterprise landscape.

To provide further context for implementations of the present disclosure, and as introduced above, enterprises use software systems to conduct operations. Example software systems can include, without limitation, enterprise resource management (ERP) systems, customer relationship management (CRM) systems, human capital management (HCM) systems, and the like. In some software systems, processes that underly operations of an enterprise are programmatically defined to enable execution of the processes using the software systems. Software systems are often implemented in very distributed computing environments. Such environments can include a cloud-computing environment and a combined on-premise and cloud-computing environment. As such, such software systems are increasingly more complex.

Applications executed in distributed computing environments rely on a highly distributed infrastructure and a high number of software artefacts (e.g., micro-services, modules, extensions). Developers, architects and system administrators require detailed and up-to-date models of software architecture and landscapes. Ideally a common structure or language, such as Unified Modeling Language (UML), is used to provide documentation on architecture and landscapes. However, significant effort is required in terms of time and resources (computing and manual) to keep the documentation up-to-date and to share the documentation in distributed team environments.

In traditional modeling systems, modeling tools only enable manual modeling of software systems. For example, a block diagram of the architecture is manually created by software architects. For selected diagram types (e.g., class diagrams), some modeling systems enable model generation from existing code. As, another example a database schema can be generated based on an entity relationship (ER) diagram. However, traditional systems do not support modeling of an enterprise landscape (i.e., the landscape across which a software system is distributed).

For example, a diagram can be created that graphically depicts the landscape, within which a service is implemented. An example service can include the SAP Cloud Platform Internet of Things (IoT) service implemented on the SAP Cloud Platform, both of which are provided by SAP SE of Walldorf, Germany. Such a landscape diagram is provided from the perspective of a service provider and visualizes the deployment of the required software artefacts on the different Infrastructure as a Service (IaaS) layers, the region, and the network (e.g., virtual private network (VPN)). As another example, a capability diagram (also referred to as a capability view) of a landscape (e.g., SAP IT Landscape) can be provided. The capability diagram graphically depicts deployed solutions, products, services, and the like across the landscape.

In both of the above-described examples, the diagrams are created manually. Further, there is no linking between the diagram and the actual systems. For example, no uniform resource locator (URL) is provided that links the diagram to the service instance that is depicted. In view of this, the diagrams need to be manually updated in the event of changes within the service and/or landscape. Further, the diagrams do not enable direct access to the depicted systems to verify correct linking and/or monitoring.

In view of the above context, implementations of the present disclosure provide an enterprise architecture design platform for modeling integrated enterprise scenarios. More particularly, implementations of the present disclosure are directed to an enterprise architecture design platform that includes an automated modeling tool, which leverages information from software tools that maintain a software system that has been provisioned into enterprise scenarios (e.g., deployed to a landscape of an enterprise) to automatically generate one or more diagrams based on a current state of the deployed software system.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an enterprise architecture design platform for modeling integrated enterprise scenarios. As described in further detail herein, the enterprise architecture design platform of the present disclosure provides an automated modeling tool that leverages information from software tools that maintain software systems that have been provisioned into enterprise scenarios (e.g., deployed to a landscape of an enterprise) to automatically generate one or more diagrams based on a current state of the deployed software system. For example, a user 112 can interact with the client device 102 to access the enterprise architecture design platform hosted within the server system 104 and can use the automated modeling tool to generate the one or more diagrams.

With continued reference to FIG. 1, an enterprise landscape 120 is depicted. In some examples, the enterprise landscape 120 can be described as the services and systems deployed on behalf of an enterprise. For example, the enterprise landscape 120 can include a cloud-based system 122 or both the cloud-based system 122 and an on-premise system 124 including software systems executing on behalf of the enterprise, as well as the physical hardware (e.g., computing devices, servers), on which the software systems are executed. In some examples, services (e.g., SAP Cloud Platform IoT) deployed within the enterprise landscape and managed and maintained using one or more tools. Example tools include, without limitation, SAP Cloud Reporting, SAP Service Provider Cockpit (SPC), and Cloud Integration Automation Service (CIAS), each of which is provided by SAP SE of Walldorf, Germany. It is contemplated, however, that implementations of the present disclosure can be realized using any appropriate tool.

For example, CIAS assists in an integration process for integrating at least a portion of a service into, for example, on-premise components of the enterprise. In general, integration services, such as CIAS, assist enterprises in setting-up the integration between enterprise systems (e.g., an enterprise landscape), and one or more cloud-based platforms provided by a vendor (e.g., vendor-provided systems). With non-limiting reference to SAP SE, an example integration can include integration between a SAP S/4HANA System to SAP SuccessFactors Employee Central to realize an example integration scenario (e.g., new hire). The CIAS simplifies, and optimizes the time required to setup the configuration between landscape components (e.g., systems within landscapes).

In CIAS, the technical configuration, business configuration, and provisioning procedure related to integration setup between landscape components are provided as guided workflows for one or more users. The detailed information about configuration steps and provisioning procedure are store in a repository within CIAS, which contains the textual description of the procedure. During execution in runtime, this textual information is transformed into workflow tasks. In some examples, an integration scenario may contain numerous configuration tasks, which can span across multiple systems. Setup activities among different systems can include manual tasks that are to be executed by administrators. For example, an integration scenario can include multiple configuration tasks, each configuration task being performed by a particular role (e.g., administrator), and a respective system.

Information provided from tools, such as Cloud Reporting and SAP SPC can represent the technical landscape and configuration. Example information can include, without limitation, the system URL, system IP, system name, system ID, system version, system type, tenant information, deployed data center, official name and additional metadata. Reporting may even include usage information (e.g., active/inactive/number of requests).

Implementations of the present disclosure are described in further detail herein with reference to an example software system and an example enterprise landscape. The example software system includes SAP Cloud Platform IoT provided by SAP SE. The example enterprise landscape includes a cloud-computing environment (e.g., Amazon Web Services (AWS) provided by Amazon Web Services, Inc.). In these examples, the example software system can include multiple cloud-computing accounts, such as a development account (e.g., devaws) and a staging account (e.g., stagingaws), each account being associated with one or more regions (e.g., US, Europe). In these examples, the cloud-computing platform can provide one or more virtual private clouds (VPCs) within each region, and each VPC has a unique address (e.g., IPv4 address). Each VPC can host one or more subnets, each subnet having a unique address and executing a service of the software system, such as an IoT service (e.g., core, gateway, messaging). It is contemplated, however, that implementations of the present disclosure can be realized using any appropriate software system and any appropriate enterprise landscape.

Figure 2:
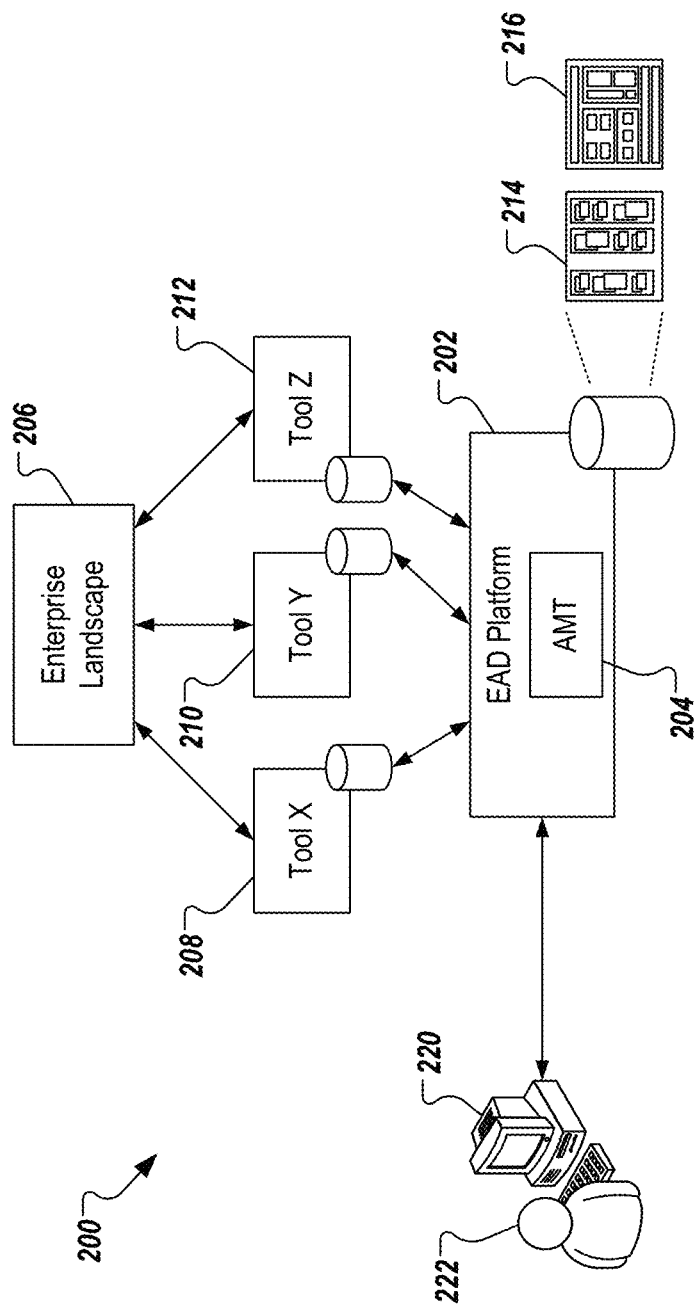
FIG. 2 depicts an example conceptual architecture in accordance with implementations of the present disclosure.

FIG. 2 depicts an example conceptual architecture 200 in accordance with implementations of the present disclosure. The example conceptual architecture 200 includes an enterprise architecture design (EAD) platform 202 that includes an automated modeling tool (AMT) 204 for modeling an enterprise landscape 206, as described herein. The example conceptual architecture 200 further includes a first software tool (Tool X) 208, a second software tool (Tool Y) 210, and a third software tool (Tool Z) 212. In some examples, one or more of the software tools 208, 210, 212 enables maintenance and/or management of a distributed software system that is provisioned within the enterprise landscape 206. For example, and without limitation, the first software tool 208 can be provided as SAP Cloud Reporting, the second software tool 210 can be provided as SAP SPC, and the third software tool 212 can be provided as SAP CIAS.

In some implementations, the enterprise architecture design platform 202 automatically generates one or more diagrams based on a current state of the deployed software system. Example diagrams depicted in FIG. 2 include a landscape diagram 214 and a capability diagram 216. In some examples, the landscape diagram 214 is from the perspective of a service provider and visualizes the deployment of the required software artefacts on, for example, different IaaS layers, the region, and the network (e.g., VPN) across the enterprise landscape 206. In some examples, the capability diagram 216 graphically depicts deployed solutions, products, services, and the like across the enterprise landscape 206. In some examples, a computing device 220 can be used by a user 222 to interact with the enterprise architecture design platform 202, the automated modeling tool 204, in particular, to provide diagrams, such as the diagram 214, 216, as described herein.

In accordance with implementations of the present disclosure, the automated modeling tool 204 enables access to landscape and deployment information from the software tools 208, 210, 212. That is, for example, the user 222 can access landscape and deployment information stored by each of the software tools 208, 210, 212. Using the examples above, example information can include accounts (e.g., an account identifier uniquely identifying an account within the cloud-computing environment), one or more regions for each account, one or more VPCs for each region (e.g., unique region addresses), one or more subnets for each regions (e.g., unique subnet addresses), and one or more service instances within each subnet.

In some implementations, the user 222 is able to manage the software tools 208, 210, 212, as connected information providers through the automated modeling tool 204. The management may cover monitoring and maintenance capabilities. For example, simple monitoring may include the availability check (online/offline) of a tool or system. Maintenance capabilities may include version updates. In addition, security capabilities such as blacklisting or whitelisting can be managed.

In some implementations, the automated modeling tool 204 receives landscape and deployment information stored from each of the software tools 208, 210, 212 based on respective formats/structures of the information as stored in each of the software tools 208, 210, 212. The information is exchanged in machine readable format such as CSV, XML or JSON representation. The information is stored persistently in a repository as underlying data layer for the modeling. In some examples, the landscape and deployment information is provided in a format that is common across each of the software tools 208, 210, 212 (also referred to herein as a common format). In some examples, each of the software tools 208, 210, 212 provides respective landscape and deployment information in the same format as each of the other software tools 208, 210, 212. In some examples, each of the software tools 208, 210, 212 provides respective landscape and deployment information in a respective format, and the respective landscape and deployment information is converted (e.g., by the automated modeling tool 204) to the common format. In some examples, the common format enables the landscape and deployment information to be processed by the automated modeling tool 204 to generate one or more models, as described herein.

In some implementations, the automated modeling tool 204 provides a set of diagrams (models) that can be generated. For example, the automated modeling tool 204 can provide a list of diagrams, which can be displayed to the user 222 by the computing device 222. In some examples, the user selects a diagram (e.g., block diagram) and, in response, the automated modeling tool 204 automatically generates the diagram with the information retrieved from software tools 208, 210, 212. In this manner, the generated diagram is representative of the actual enterprise scenario of the enterprise landscape 206.

By way of non-limiting example, the landscape diagram 214 can be considered in view of the above-described examples of SAP Cloud Platform IoT implemented in a cloud-computing environment (e.g., AWS). In some examples, the automated modeling tool 204 receives one or more files from at least one of the software tools 208, 210, 212. For example, the automated modeling tool 204 can receive a spreadsheet file (e.g., MS Excel), which records information describing the enterprise landscape (e.g., an account identifiers, one or more regions for each account, one or more VPC addresses, one or more subnet addresses, and one or more service instance identifiers and/or descriptions).

In some implementations, for each type of information, the automated modeling tool 204 provides a template shape (e.g., rectangular). For example, for an account, the automated modeling tool 204 provides a shape, for a VPC, the automated modeling tool 204 provides a shape within the shape representing a respective account, for a subnet, the automated modeling tool 204 provides a shape within the shape representing a respective VPC, and for a service instance, the automated modeling tool 204 provides a shape within the shape representing a respective subnet. In some examples, each template shape includes a title (e.g., Account, Region, VPC, Subnet, Instance) and one or more fields for respective information. In some examples, each field is populated with respective information (e.g., addresses). In some implementations, a field can be populated with a URL that provides a link to the enterprise landscape. In this manner, the landscape diagram 214 enables the URL to be selected (e.g., clicked on) and navigation to the underlying landscape component (e.g., IoT service).

The models contain various attributes that cover any kind of information related to system landscape, services or software artefacts. Custom extensions (e.g., additional user defined attributes) are possible as well. Based on keys or manual mapping the information is transferred to the model. For example, URL information is passed in an JSON representation and based on the key the information is transferred to the according model.

In some implementations, the automated modeling tool 204 provides an editor (e.g., displayed in the computing device 220), through which the user 222 can manually adjust the generated diagram. For example, the 222 can use the editor to adjust a layout of components depicted within the diagram. As another example, the user 222 can manually edit, add, and/or delete titles and other information depicted within the diagram.

Figure 3:
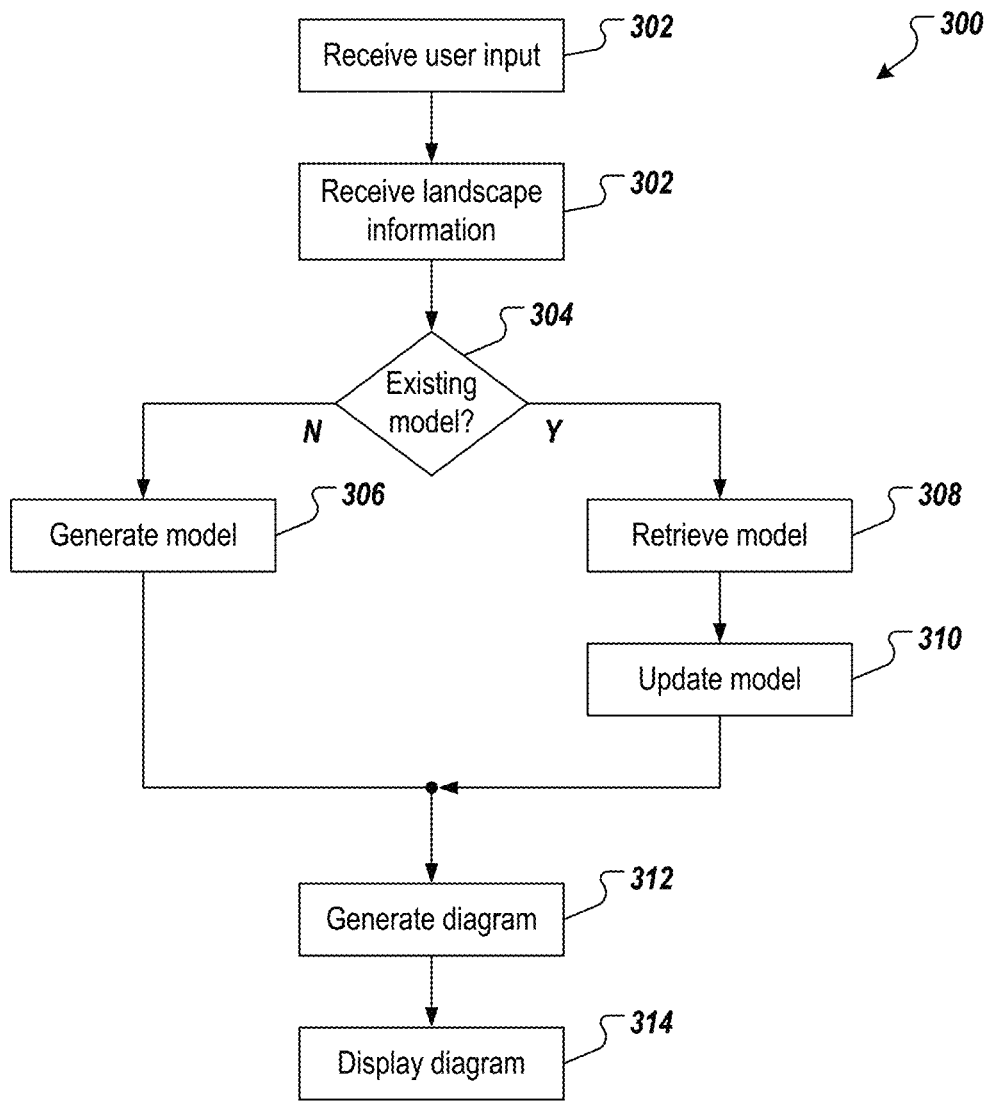
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

User input is received (302). For example, and with reference to FIG. 2, the user 222 provides input to the enterprise architecture design platform 202 through the computing device 220. In some examples, the user input includes an identifier uniquely identifying a software system that is executed within the enterprise landscape 206. In some examples, the user input includes a type of diagram that is to be generated (e.g., landscape diagram, capability diagram). Landscape information is received (304). For example, the automated modeling tool 204 queries one or more of the software tools 208, 210, 212. In some examples, a query includes an identifier uniquely identifying the software system that is executed within the enterprise landscape 206. In some examples, in response to the query, information is received from the one or more software tools 208, 210, 212, the information describing the software system as executed in the enterprise landscape 206.

It is determined whether there is an existing model (306). For example, the automated modeling tool 204 determines whether a landscape model has already been generated for the identified software system. In some examples, the automated modeling tool 204 compares the identifier of the software system to identifiers of software systems having models stored in a model repository. If the identifier matches an identifier of a software system having a model stored in the model repository, it is determined that a landscape model has already been generated for the identified software system.

If it is determined that there is not an existing model, a model is generated (308). For example, the automated modeling tool 204 generates a model file that is populated with information representing the software system and the enterprise landscape 204 and populates the model file with information received from the one or more software tools 208, 210, 212. If it is determined that there is an existing model, the existing model is retrieved (310) and the model is updated (312). For example, information recorded in the model file can be compared to information that is received from the one or more software tools 208, 210, 212. Information that is inconsistent between the two can be updated (e.g., added, deleted, modified).

A diagram is generated (314). For example, and as described herein, for each type of information, the automated modeling tool 204 provides a template shape (e.g., rectangular). For example, for an account, the automated modeling tool 204 provides a shape, for a VPC, the automated modeling tool 204 provides a shape within the shape representing a respective account, for a subnet, the automated modeling tool 204 provides a shape within the shape representing a respective VPC, and for a service instance, the automated modeling tool 204 provides a shape within the shape representing a respective subnet. In some examples, each template shape includes a title (e.g., Account, Region, VPC, Subnet, Instance) and one or more fields for respective information. In some examples, each field is populated with respective information (e.g., addresses).

The diagram is displayed (316). For example, the diagram is displayed to the user 222 by the computing device 220. In some examples, the diagram is displayed within an editor, through which the user 222 can edit the diagram. In some implementations, and as described herein, the diagram can include one or more URLs that can be selected to navigate the user 222 to a respective portion of the software system and/or component of the enterprise landscape 204. In case the modeling tool provides authentication, the user information may also be used to check authorization of system access in advance and visualize authorization rights accordingly.

Figure 4:
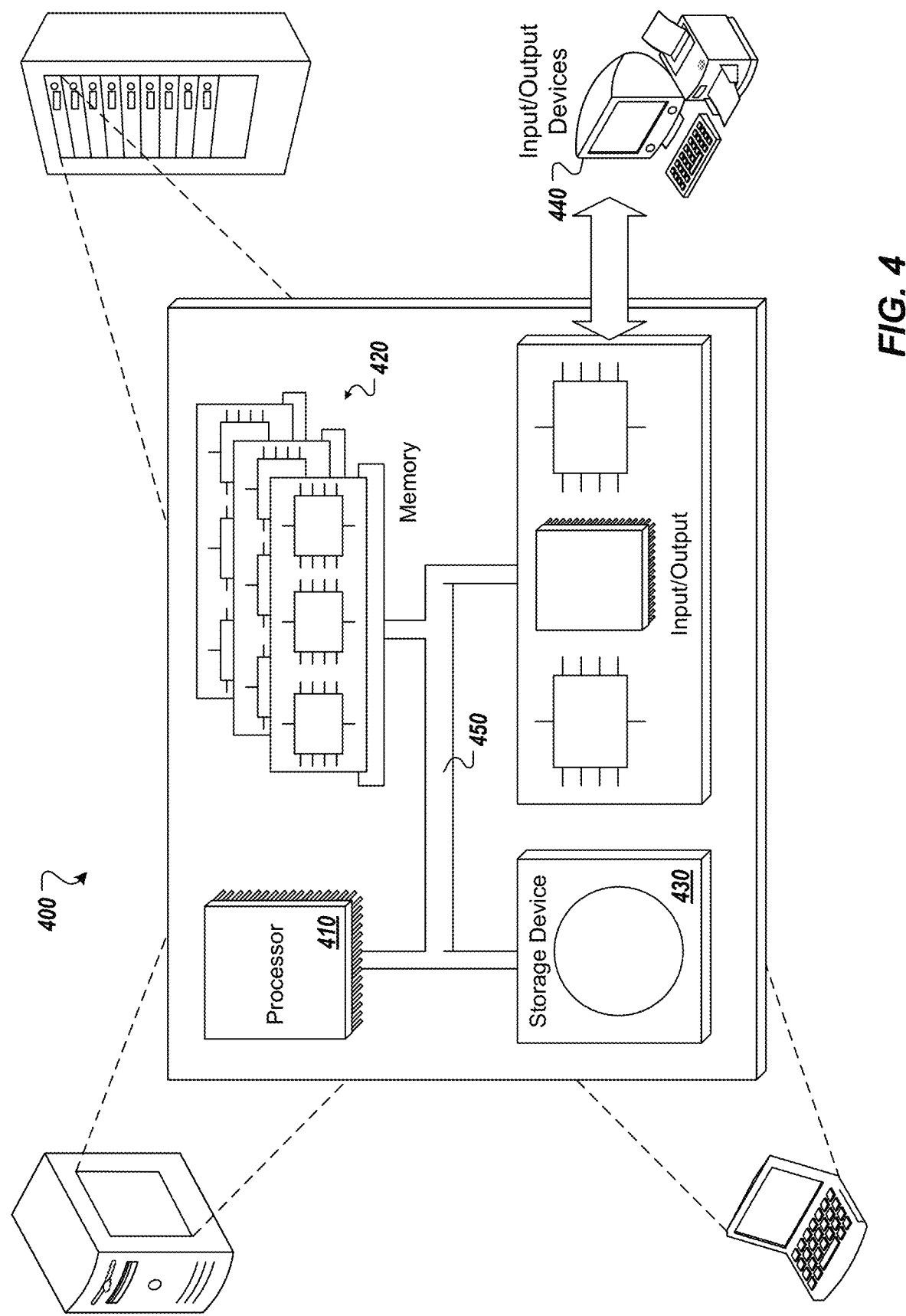
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for automatically generating a model visualized in a diagram representing a software system deployed within an enterprise landscape, the method being executed by one or more processors and comprising:
    receiving, by an automated modeling tool of an enterprise architecture designer, information representing the software system as deployed in the enterprise landscape, the information being received from one or more software tools in a format that is common across each of the one or more software tools, the format enabling processing of the information for generation of a model of the software system, the one or more software tools being executed to maintain the software system within the enterprise landscape;
    determining, by the automated tool, that the model has been generated for the software system represented by the received information;
    in response to the determination that the model has not been generated for the software system represented by the received information, generating, by the automated modeling tool, the model of the software system as deployed in the enterprise landscape based on the information received from the one or more software tools, the model being stored in a model repository, wherein the model comprises data representing the software system, the enterprise landscape, and the information received from one or more software tools; and
    displaying a diagram based on data stored in the model repository, the diagram graphically representing the software system as deployed in the enterprise landscape.

2. The method of claim 1, wherein the diagram comprises one or more uniform resource locators (URLs) that is selectable to navigate to one or more of a respective portion of the software system and a component of the enterprise landscape.

3. The method of claim 1, further comprising transmitting, by the automated modeling tool, a query to the one or more software tools, the query comprising an identifier that uniquely identifies the software system, the information representing the software system as deployed in the enterprise landscape being received in response to the query.

4. The method of claim 1, wherein the one or more software tools comprise one or more of a reporting tool, an integration tool, and an informational tool.

5. The method of claim 1, further comprising determining that the model of the software system as deployed in the enterprise landscape, and, in response, generating the model comprises updating the model based on the information.

6. The method of claim 1, further comprising receiving user input to the diagram and modifying the model based on the user input.

7. The method of claim 1, wherein the diagram comprises one of a system landscape diagram and a capability diagram.

8. A non-transitory computer-readable storage medium coupled to one or more processors and having instructions stored thereon which, when executed by the one or more processors, cause the one or more processors to perform operations for automatically generating a diagram representing a software system deployed within an enterprise landscape, the operations comprising:
    receiving, by an automated modeling tool of an enterprise architecture designer, information representing the software system as deployed in the enterprise landscape, the information being received from one or more software tools in a format that is common across each of the one or more software tools, the format enabling processing of the information for generation of a model of the software system, the one or more software tools being executed to maintain the software system within the enterprise landscape;
    determining, by the automated tool, that the model has been generated for the software system represented by the received information;
    in response to the determination that the model has not been generated for the software system represented by the received information, generating, by the automated modeling tool, the model of the software system as deployed in the enterprise landscape based on the information received from the one or more software tools, the model being stored in a model repository, wherein the model comprises data representing the software system, the enterprise landscape, and the information received from one or more software tools; and
    displaying a diagram based on data stored in the model repository, the diagram graphically representing the software system as deployed in the enterprise landscape.

9. The non-transitory computer-readable storage medium of claim 8, wherein the diagram comprises one or more uniform resource locators (URLs) that is selectable to navigate to one or more of a respective portion of the software system and a component of the enterprise landscape.

10. The non-transitory computer-readable storage medium of claim 8, wherein operations further comprise transmitting, by the automated modeling tool, a query to the one or more software tools, the query comprising an identifier that uniquely identifies the software system, the information representing the software system as deployed in the enterprise landscape being received in response to the query.

11. The non-transitory computer-readable storage medium of claim 8, wherein the one or more software tools comprise one or more of a reporting tool, an integration tool, and an informational tool.

12. The non-transitory computer-readable storage medium of claim 8, wherein operations further comprise determining that the model of the software system as deployed in the enterprise landscape, and, in response, generating the model comprises updating the model based on the information.

13. The non-transitory computer-readable storage medium of claim 8, wherein operations further comprise receiving user input to the diagram and modifying the model based on the user input.

14. The non-transitory computer-readable storage medium of claim 8, wherein the diagram comprises one of a system landscape diagram and a capability diagram.

15. A system, comprising:
   a computing device; and
   a computer-readable storage device coupled to the computing device and having instructions stored thereon which, when executed by the computing device, cause the computing device to perform operations for natural language explanations for automatically generating a diagram representing a software system deployed within an enterprise landscape, the operations comprising:
      receiving, by an automated modeling tool of an enterprise architecture designer, information representing the software system as deployed in the enterprise landscape, the information being received from one or more software tools in a format that is common across each of the one or more software tools, the format enabling processing of the information for generation of a model of the software system, the one or more software tools being executed to maintain the software system within the enterprise landscape;
      determining, by the automated tool, that the model has been generated for the software system represented by the received information;
   in response to the determination that the model has not been generated for the software system represented by the received information, generating, by the automated modeling tool, the model of the software system as deployed in the enterprise landscape based on the information received from the one or more software tools, the model being stored in a model repository, wherein the model comprises data representing the software system, the enterprise landscape, and the information received from one or more software tools; and
   displaying a diagram based on data stored in the model repository, the diagram graphically representing the software system as deployed in the enterprise landscape.

16. The system of claim 15, wherein the diagram comprises one or more uniform resource locators (URLs) that is selectable to navigate to one or more of a respective portion of the software system and a component of the enterprise landscape.

17. The system of claim 15, wherein operations further comprise transmitting, by the automated modeling tool, a query to the one or more software tools, the query comprising an identifier that uniquely identifies the software system, the information representing the software system as deployed in the enterprise landscape being received in response to the query.

18. The system of claim 15, wherein the one or more software tools comprise one or more of a reporting tool, an integration tool, and an informational tool.

19. The system of claim 15, wherein operations further comprise determining that the model of the software system as deployed in the enterprise landscape, and, in response, generating the model comprises updating the model based on the information.

20. The system of claim 15, wherein operations further comprise receiving user input to the diagram and modifying the model based on the user input.

* * * * *